Jan. 19, 1932.  C. W. STICKEL ET AL  1,842,127
FISH LURE
Filed Jan. 24, 1931
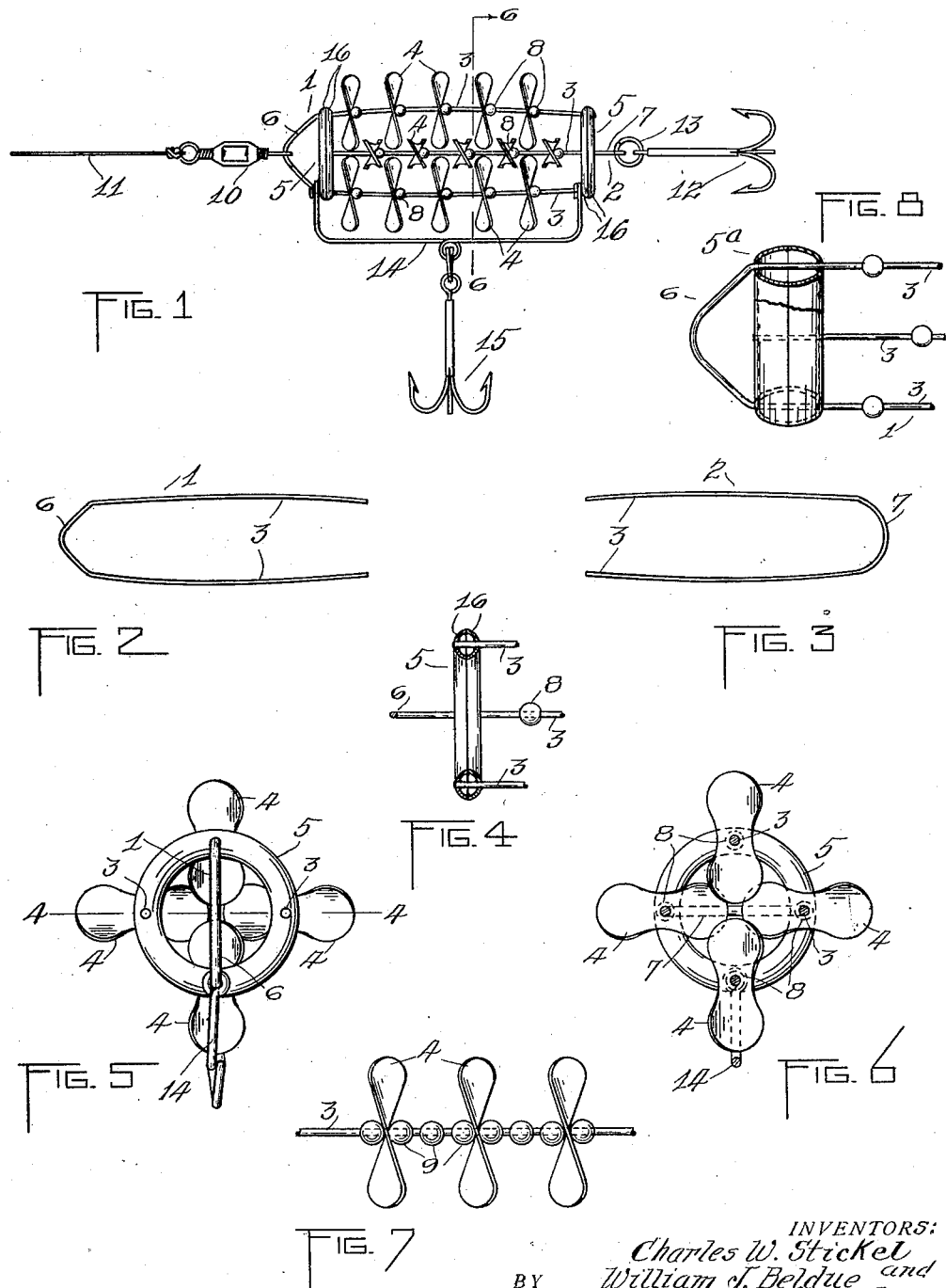
INVENTORS:
Charles W. Stickel
William J. Beldue and
BY Joseph J. Juhasz
their ATTORNEY Patented Jan. 19, 1932

1,842,127

UNITED STATES PATENT OFFICE

CHARLES W. STICKEL AND WILLIAM J. BELDUE, OF ROCHESTER, NEW YORK, ASSIGNORS TO WALTON PRODUCTS COMPANY, OF ROCHESTER, NEW YORK, A FIRM

FISH LURE

Application filed January 24, 1931. Serial No. 511,080.

The present invention while relating to artificial fish lures or bait used in trolling and casting, has more especial reference to the type in which a plurality of spinners spaced apart on a wire are caused to rotate when drawn through the water, an object of the invention being to provide a bait of this character which is of distinctly novel construction and which will provide an attraction or lure for fish as a stimulus for striking.

In accomplishing the invention, instead of providing a single wire on which the spinners are mounted, as has heretofore been suggested, we provide a plurality of substantially parallel wires, with the spinners on one wire alternating and in overlapping relation with those on another wire, these spinners being in the form of propeller blades and so bent that those on one wire rotate in one direction and those on an adjacent wire in the opposite direction.

A further object of the invention is to provide a device of the character described comprising a plurality of spinners adapted to rotate when drawn through the water and so arranged as to prevent the bait as a whole from rotation.

A further object of the invention is to provide a bait of substantial rigidity but having sufficient resiliency as not to be broken or bent when a fish strikes.

A further object of the invention is the provision of a fish lure that when drawn through the water will produce a humming sound.

A further object of the invention is to so construct the frame work of the bait as to give it buoyancy.

And, a still further object of the invention is to provide a lure which is attractive in appearance, inexpensive in construction, and so formed as to withstand hard usage.

To these and other ends as will be become manifest by a more complete description, the invention consists of certain parts and combinations of parts as will be fully set forth in the following description and particularly defined in the appended claims.

The accompanying drawings illustrating the invention and forming a part of the specification are as follows:

Figure 1 is a view of the lure in side elevation.

Figs. 2 and 3 are side views of the U-shaped frame members on which the spinners are mounted.

Fig. 4 is a sectional detail as on line 4—4, Fig. 5.

Fig. 5 is an end view from the left with respect to Fig. 1, and drawn to a larger scale, the hooks being removed.

Fig. 6 is a sectional view on line 6—6, Fig. 1.

Fig. 7 is a fragmentary detail showing a modified form of spinner spacing means, and, Fig. 8 is a view partly in side elevation and partly in section, with spinners removed, showing a modification of the invention in which the frame is made buoyant.

In the drawings, similar reference numerals refer to similar parts throughout the several views.

The device includes, in this instance, two U-shaped members 1 and 2 in opposed relation and arranged at right angles to each other, the arms 3 of each member comprising spindles on which spinners 4 are loosely mounted in spaced relation and adapted to rotate when drawn through the water. The members 1 and 2 are held in proper angular relation to each other by two end rings 5, each of which is perforated to permit the arms 3 to extend therethrough, one of these rings 5 receiving the free ends of the U-shaped member 2 and the arms of the member 1 at substantially their juncture with the connecting bend 6, while the other ring receives the free ends of the arms of the member 1 and the arms of the member 2 adjacent its connecting bend 7, the arms being soldered or otherwise attached to the rings to prevent the two U-shaped members being drawn relatively apart. The rings 5, in this instance, are oval in cross-section each being formed of two opposing dished half sections 16 soldered along their abutting peripheral edges.

The spinners 4 are maintained on their respective arms 3 in spaced relation to each other and it is preferable that such spacing means permit a limited axial movement of the spinners, the purpose of this flexibility of movement being to overcome any tendency of one spinner setting up a resistance in the water that would retard rotation of the following spinner on the same spindle. To this end beads 8 are placed on the spindles alternately with the spinners 4 and spaced equal distances apart, in which position they are subjected to pressure which securely binds them to the spindles. The beads 8 on the arms 3 of each U-shaped member are arranged opposite each other with those on the arms of the member 1 staggered with respect to those on the arms of the member 2 and, consequently, the spinners 4 on adjacent arms will be staggered with respect to each other. The spinners on the arms of the member 1 are so formed as to rotate in one direction while those on the arms of the member 2 are given a twist whereby they rotate in the opposite direction. Thus, it will be observed that with the spinners on adjacent arms rotating in reverse directions when the bait is drawn through the water, a counter force or balance, so to speak, is effected which prevents the device as a whole from turning about its axis.

In order to make the lure as compact as possible transversely and employ spinners of maximum length permitted thereby, the circle in which the spindles or arms 3 are arranged at 90° to each other need only be slightly greater in diameter than the length of the spinners so as to permit rotation without interference with each other of the spinners on opposite arms, as those on adjacent arms are alternately arranged and in overlapping relation.

If desired, beads 9 such as illustrated in Fig. 7 and which are not fixed to the spindles 3, may be employed as spacing means for the spinners. In this instance, the axial movement of the spinners would necessarily be limited to a shorter distance than when the fixed beads or stops 8 are employed in order to prevent a bunching of the spinners on their respective spindles.

The bend 6 in the member 1 is, through a swivel connection 10, attached to the line 11, while a gang hook 12, or single hook, through a ring 13 or other suitable attachment, is connected to the bend 7 of the member 2.

If desirable, a wire 14 extending substantially parallel with the arms 3, may be employed as a means to which another set of gang hooks 15 or single hook may be attached, this wire having lateral extensions at its ends which are connected in any suitable manner to opposite ends of one of the arms 3 or to the retaining rings 5. The hook on this wire 14 would act as a weight or sinker for holding the bait in the water and as a balancing means acting to overcome any tendency of the bait to dive.

The heads or end rings 5 are hollow and oval in cross section, each such member comprising two opposing dished rings or half sections 16 united along their peripheral edges, these rings being apertured to receive the spindle arms 3. By making the members 5 hollow solder may be placed therein so as to unite the half sections 16 and also secure the spindle arms 3 thereto.

If desired, the lure or bait may be made buoyant. In such event, the hollow rings or end members are elongated, as indicated at 5ª in Figure 8, these members, irrespective of the solder required to unit the half sections and secure the spindle arms thereto, acting as floats and having sufficient buoyancy to support the bait on the water.

While we have shown a construction in which the spindles are the side arms of two opposing U-shaped members, the connecting bends forming attaching means for hook and line, and with the end members as rings formed in the manner hereinabove stated, it will be understood that we do not limit ourselves to this particular construction and that it is within the scope of the invention to provide end members other than rings, spindles which need not necessarily be the side arms of U-shaped members and hook and line attaching means which may be other devices than connecting bends such as shown.

It may also be stated that, while the device is of substantially rigid construction, the arms 3 being made of piano wire have a degree of resiliency and are preferably slightly bowed as indicated. Consequently, when a fish "strikes" the spindles will yield and then spring back to normal position thus preventing them from being bent or broken and the spinners on one spindle from interlocking with those on another spindle.

By providing a plurality of rapidly and uniformly rotatable spinners we have constructed a bait which when traveling through the water produces a humming sound which tends to lure the fish. And, for the purpose of making it attractive various parts of the bait may be of different colors.

What we claim is:

1. The combination, in a fish lure, of two end members, a plurality of spindles extending between said end members, a plurality of spinners rotatably mounted on each of said spindles, and means on the spindles for maintaining the spinners in spaced relation to each other.

2. A fish lure in accordance with claim 1 characterized by said spacing means permitting limited axial movement of the spinners.

3. A combination in accordance with claim 1 characterized by said spindles being resilient and said end members forming rigid connections between the spindles.

4. A combination in accordance with claim 1 characterized by said spindles being resilient and bowed outwardly.

5. The combination, in a fish lure, of two end members, a plurality of spindles extending between said end members, a plurality of spinners rotatably mounted on each of said spindles, said spinners comprising screw propellers, and stops on the spindles for limiting axial movement of the spinners.

6. A fish lure in accordance with claim 5 characterized by the screw propeller spinners on one or more of said spindles having a twist whereby they rotate in one direction, and those on the other spindle or spindles having a twist whereby they rotate in the reverse direction, when the device is drawn through the water.

7. A fish lure in accordance with claim 5 characterized by the spinners on adjacent spindlers being alternately arranged and in overlapping relation.

8. A fish lure in accordance with claim 5 characterized by the screw propeller spinners on adjacent spindles being alternately arranged, in overlapping relation, and with the twist of their blades in reverse directions, for the purpose set forth.

9. A fish lure including, in combination, a drawn wire bent U-shape to form side arms and a connecting bend, a plurality of rotatable spinners on each of said arms, a plurality of regularly spaced stops on said arms and alternating with the spinners, the spinners being free for axial movement between the stops, and a connection between the free ends of said arms.

10. The combination, in a fish lure, of two drawn wires bent U-shape to form connecting bends and side arms, said U-shape members being in opposed relation and at right angles to each other, end members providing rigid connection between said arms adjacent their ends, spinners rotatable and axially movable on said arms, and stops alternately arranged on said arms with the spinners for maintaining the latter in spaced relation and limiting axial movement thereof.

11. A fish lure in accordance with claim 10 characterized by said end members being rings having perforations for receiving said arms.

12. A fish lure in accordance with claim 10 characterized by the connecting bend of one U-shape member providing an attachment for a line, and the connecting bend of the other such member providing an attachment for a hook.

13. The combination, in a fish lure, of two drawn wires bent U-shape to form connecting bends and side arms, said U-shape members being in opposed relation and at right angles to each other, end members providing rigid connection between said arms adjacent their ends, spinners rotatable and axially movable on said arms, said spinners comprising screw propellers, and stops on the arms alternating with the spinners for limiting axial movement of the spinners, the spinners on the arms of one U-shape member being alternately arranged and in overlapping relation with respect to those on the arms of the other U-shape member.

14. A fish lure in accordance with claim 13 characterized by the spinners on the arms of one U-shape member being rotatable in one direction and those on the arms of the other member being rotatable in the reverse direction, for the purpose set forth.

15. The combination, in a fish lure, of a frame comprising two spaced and axially aligned rings having perforations therethrough, and two drawn wires bent U-shape to provide side arms and connecting bends, the two U-shape members being in opposed relation and at right angles to each other with their arms extending through the perforations in said rings, the latter forming means for holding the arms in proper spaced relation; spinners rotatable on said arms, stops on said arms, each spinner being axially movable between two adjacent stops, and, a wire offset from said frame and out of the path of said spinners, the ends of such wire being connected to opposite ends of the frame, said wire providing an attachment for a hook, the connecting bend in one of said U-shape members providing an attachment for another hook, and the connecting bend of the other U-shape member providing an attachment for a line.

16. A fish lure including a plurality of spindles, spinners rotatable on the spindles, means on the spindles for maintaining the spinners in spaced relation and permitting axial movement thereof, and an end member to which said spindles are connected, said end member comprising two opposing dished rings united along their peripheral edges to form a hollow body and having apertures for receiving said spindles.

17. A fish lure in accordance with claim 16 characterized by said hollow end member containing solder for uniting the ring sections along their peripheral edges and the spindles to the end member.

18. A buoyant fish lure including a plurality of spindles, means on the spindles for maintaining the spinners in spaced relation and permitting axial movement thereof, and an end member to which said spindles are attached, such end member comprising a ring shaped float.

19. A fish lure including an end member, a plurality of spindles extending from said end member, means for producing a humming sound as the lure is drawn through water comprising a plurality of spinners rotatable on said spindles, and means on each spindle for maintaining the spinners thereon in spaced relation.

CHARLES W. STICKEL.
WILLIAM J. BELDUE.